(12) United States Patent
Shim et al.

(10) Patent No.: US 11,660,986 B2
(45) Date of Patent: May 30, 2023

(54) POWERED RAIL APPARATUS FOR VEHICULAR SEAT

(71) Applicant: HYUNDAI TRANSYS INC., Seosan-si (KR)

(72) Inventors: Sung Min Shim, Hwaseong-si (KR); Gyong Min Kim, Hwaseong-si (KR); Seong Jun Hwang, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 182 days.

(21) Appl. No.: 17/339,364

(22) Filed: Jun. 4, 2021

(65) Prior Publication Data

US 2021/0394647 A1    Dec. 23, 2021

(30) Foreign Application Priority Data

Jun. 22, 2020  (KR) .......................... 10-2020-0075443

(51) Int. Cl.
*B60N 2/06* (2006.01)
*B60N 2/02* (2006.01)

(52) U.S. Cl.
CPC ........... *B60N 2/067* (2013.01); *B60N 2/0232* (2013.01); *B60N 2002/0236* (2013.01)

(58) Field of Classification Search
CPC .... B60N 2/067; B60N 2/0232; B60N 2/0887; B60N 2/0705; B60N 2/0806; B60N 2/0715; B60N 2/0725; B60N 2/073; B60N 2/07; B60N 2/06; B60N 2/08; B60N 2/0812; B60N 2/0818; B60N 2/0831; B60N 2/0837; B60N 2/0843; B60N 2/085; B60N 2/0875; B60N 2/0862; B60N 2/0236

See application file for complete search history.

(56) References Cited

U.S. PATENT DOCUMENTS

| 6,267,430 | B1 | 7/2001 | Cresseaux |
| 10,589,640 | B2 * | 3/2020 | Nakamura ........... B60N 2/0224 |
| 11,433,786 | B2 * | 9/2022 | Okumura ............... H02G 11/02 |
| 2004/0159764 | A1 * | 8/2004 | Oshima .................. B60N 2/067 296/65.13 |
| 2018/0334054 | A1 | 11/2018 | Higuchi et al. |
| 2018/0370388 | A1 * | 12/2018 | Nakamura .......... B60R 16/0215 |

(Continued)

FOREIGN PATENT DOCUMENTS

| CN | 110641322 A | 1/2020 |
| CN | 110641324 A | 1/2020 |
| JP | 2019-006274 A | 1/2019 |

(Continued)

*Primary Examiner* — Nkeisha Smith

(57) ABSTRACT

The present invention provides a powered rail apparatus for a vehicular seat. A stationary rail is mounted to a floor panel so as to be hidden, and a movable rail, which is to be assembled with a seat, is coupled to the stationary rail via a rack-and-pinion mechanism so as to be moved anteroposteriorly. A power cable, which is configured to supply the power required to move the movable rail anteroposteriorly, to a motor, is disposed in the stationary rail so as to be hidden and so as to be moved together with the movable rail such that the movable rail can be smoothly moved forwards and backwards. Since the stationary rail and the power cable are embedded in the floor panel, it is possible to realize planarization of the floor panel.

10 Claims, 6 Drawing Sheets

(56) References Cited

U.S. PATENT DOCUMENTS

| | | | |
|---|---|---|---|
| 2019/0084453 A1 | 3/2019 | Petit et al. | |
| 2020/0108737 A1* | 4/2020 | Runde | B60N 2/0707 |

FOREIGN PATENT DOCUMENTS

| | | | |
|---|---|---|---|
| JP | 2019-022379 A | 2/2019 | |
| JP | 2020-040633 A | 3/2020 | |
| KR | 1020100033583 A | 3/2020 | |
| KR | 1020200058186 A | 5/2020 | |
| WO | 2010/103904 A1 | 9/2010 | |
| WO | 2019/188811 A1 | 10/2019 | |

* cited by examiner

POWERED RAIL APPARATUS FOR VEHICULAR SEAT

CROSS-REFERENCE TO RELATED APPLICATION

This application claims under 35 U.S.C. § 119(a) the benefit of priority to Korean Patent Application No. 10-2020-0075443 filed on Jun. 22, 2020, the entire contents of which are incorporated herein by reference.

BACKGROUND

(a) Technical Field

The present disclosure relates to a powered rail apparatus for a vehicular seat. More particularly, it relates to a powered rail apparatus for a vehicular seat in which a stationary rail, to which a movable rail to be assembled with a seat is coupled so as to be moved forwards and backwards, is mounted in a floor panel so as to be hidden and in which a power cable is also disposed in the stationary rail so as to be hidden, thereby realizing planarization of the appearance of the floor panel.

(b) Background Art

A powered long rail apparatus for a vehicle refers to an apparatus configured to increase the anteroposterior stroke of a seat in order to improve the convenience by which a passenger sitting on the seat moves to a desired position.

The powered long rail apparatus is capable of providing an anteroposterior stroke of 500-1000 mm, compared to a conventional anteroposterior stroke of 200-250 mm, and of providing the convenience of allowing a seat to be automatically moved to a desired position in the inside of a vehicle or to a position at which a passenger can easily get in or out of the vehicle. Accordingly, the powered long rail apparatus may be usefully applied not only to general vehicles but also to autonomous vehicles to be made commercially available in the future.

Typically, the powered long rail apparatus includes a stationary rail mounted to a floor panel, a movable rail coupled to the stationary rail so as to be moved forwards and backwards, and a motor and a power cable, which are configured to supply the power required to move the movable rail forwards and backwards. A seat is mounted on the movable rail.

In the powered long rail apparatus, when power from a battery power source is supplied to the motor via the power cable, the movable rail assembled with the seat is moved forwards or backwards along the stationary rail by the activated motor, thereby implementing adjustment of the position of the seat in an anteroposterior direction.

However, such a conventional powered long rail apparatus has the following disadvantages.

First, because the stationary rail is mounted on the floor panel in the state of projecting upwards and extending anteroposteriorly, although there is demand for planarization of the floor panel for the convenience of indoor activity of a passenger, there is a disadvantage in that the projecting stationary rail serves as a factor inhibiting planarization of the floor panel.

Second, because the length of a power cable, wiring and the like, which are configured to transmit power for moving the movable rail anteroposteriorly, to the motor, increases in proportion to increase in the anteroposterior stroke of the movable rail, the power cable, the wiring and the like are exposed from the floor panel due to insufficient finish treatment thereof, and thus there is a disadvantage in that the power cable, the wiring and the like also serve as a factor inhibiting the planarization of the floor panel.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art. An object of the present invention is to provide a powered rail apparatus for a vehicular seat in which a stationary rail is mounted to a floor panel so as to be hidden, a movable rail, which is to be assembled with a seat, is coupled to the stationary rail via a rack-and-pinion mechanism so as to be moved anteroposteriorly, and a power cable, which is configured to supply the power, required to move the movable rail anteroposteriorly, to a motor, is disposed in the stationary rail so as to be hidden and so as to be moved together with the movable rail such that the movable rail can be smoothly moved forwards and backwards and such that the stationary rail and the power cable are embedded in the floor panel, thereby realizing planarization of the floor panel.

In one aspect, the present invention provides a powered rail apparatus for a vehicular seat, including a stationary rail mounted to a floor panel in the state of being hidden thereby, the stationary rail having an open path for forward and backward movement of a movable rail and having therein a roller transfer path, a main transfer path and a rack-mounting space, which are disposed in a predetermined arrangement, a rack mounted in the rack-mounting space, the movable rail including a seat-mounting plate, which is disposed above the stationary rail, and a rail-supporting plate, which is disposed in the main transfer path in the stationary rail so as to be movable forwards and backwards, the seat-mounting plate and the rail-supporting plate being integrally formed with each other, a roller, which is rotatably mounted to the rail-supporting plate of the movable rail and is disposed in the roller transfer path in the stationary rail so as to be rolled, a gearbox mounted at a predetermined position on the movable rail, a motor connected to an input shaft of the gearbox, a pinion, which is mounted to a rotating shaft extending toward an inside of the stationary rail from an output shaft of the gearbox and which is engaged with the rack, and a power cable, which is connected to the rail-supporting plate of the movable rail and is movably disposed in the main transfer path of the stationary rail so as to supply power to the motor.

In a preferred embodiment, the stationary rail may be constructed such that the main transfer path is positioned under the open path in which the rail-supporting plate and the power cable are disposed so as to be moved forwards and backwards and such that the roller transfer path and the rack-mounting space are respectively and independently formed in upper and lower portions of two lateral sides of the main transfer path, with a partition wall interposed therebetween.

In another preferred embodiment, the stationary rail may include a panel-mounting end projecting from an upper portion of an outer surface thereof for assembly with the floor panel.

In still another preferred embodiment, the stationary rail may have a seating groove formed in a bottom surface thereof in which the power cable is seated.

In yet another preferred embodiment, the power cable may be made of a flexible flat cable capable of being bent.

In still yet another preferred embodiment, the seat-mounting plate of the transfer rail may include a gearbox-mounting plate which is configured to be flush with the seat-mounting plate, and a gearbox may be mounted on the lower surface of the gearbox-mounting plate.

In a further preferred embodiment, the roller may include a first roller and a second roller, which are respectively mounted to front and rear portions of the rail-supporting plate and are disposed in the roller transfer path so as to be rolled.

In another further preferred embodiment, the powered rail apparatus may further include a first bracket securely mounted to a rear end of the stationary rail, a first cable connector, which is conductively connected to one end of the power cable and is mounted to the first bracket, a second bracket mounted to a front end of the rail-supporting plate, and a second cable connector, which is conductively connected to a remaining end of the power cable and is mounted to the second bracket.

In still another further preferred embodiment, a second wire may be disposed between the second cable connector and the motor, and may be connected thereto so as to supply power to the motor.

In yet another further preferred embodiment, a power supply connector may be connected to the first cable connector via a first wire disposed on a bottom surface of the floor panel.

Other aspects and preferred embodiments of the invention are discussed infra.

It is to be understood that the term "vehicle" or "vehicular" or other similar terms used herein are inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative-fuel vehicles (e.g. fuels derived from resources other than petroleum). As referred to herein, a hybrid vehicle is a vehicle that has two or more sources of power, for example a vehicle powered by both gasoline and electricity.

The above and other features of the invention are discussed infra.

BRIEF DESCRIPTION OF THE DRAWINGS

The above and other features of the present invention will now be described in detail with reference to certain exemplary embodiments thereof, illustrated in the accompanying drawings which are given hereinbelow by way of illustration only, and thus are not limitative of the present invention, and wherein.

Figure 1:
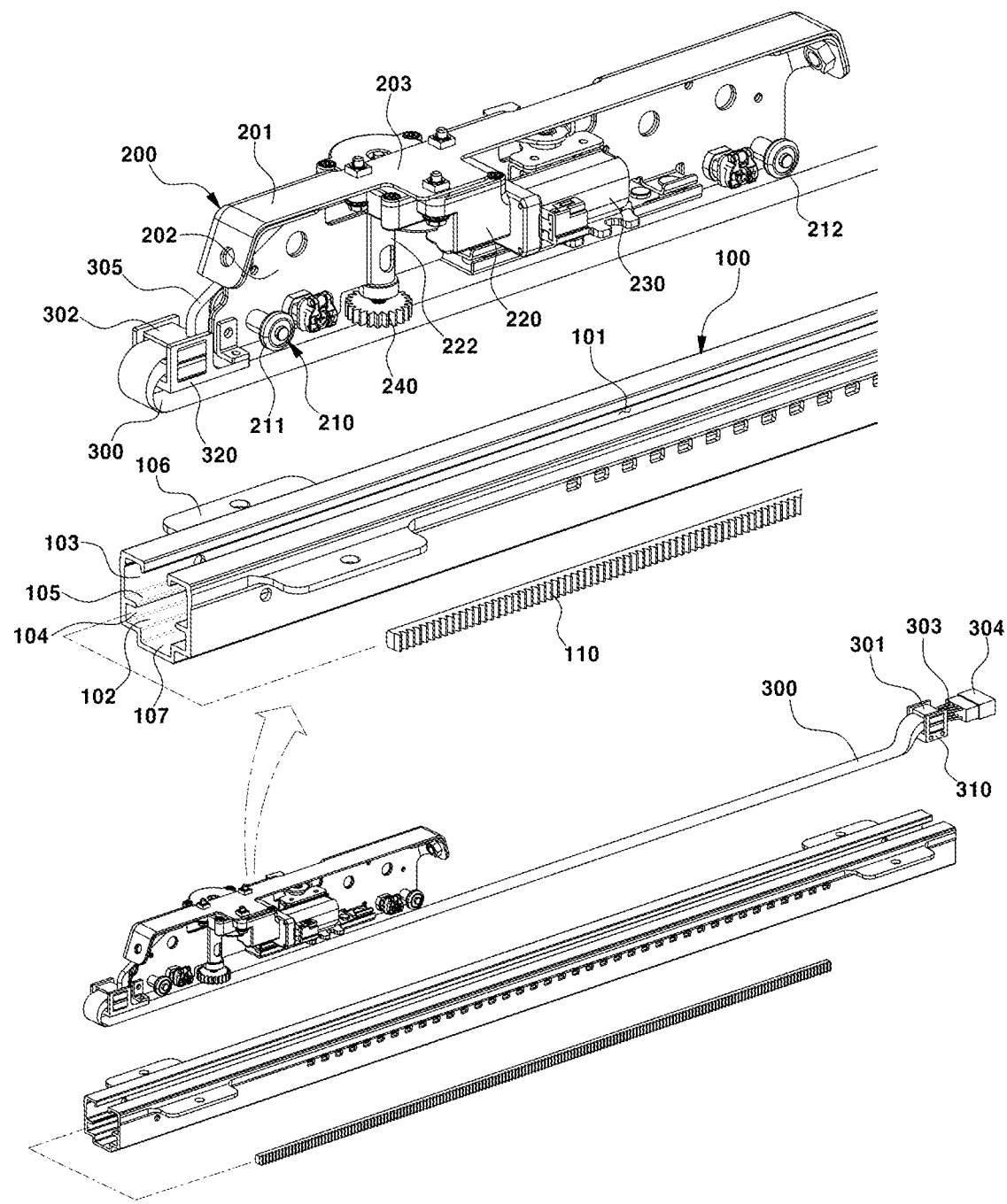
FIG. 1 is an exploded perspective view of a powered rail apparatus for a vehicular seat according to the present invention.
Figure 2:
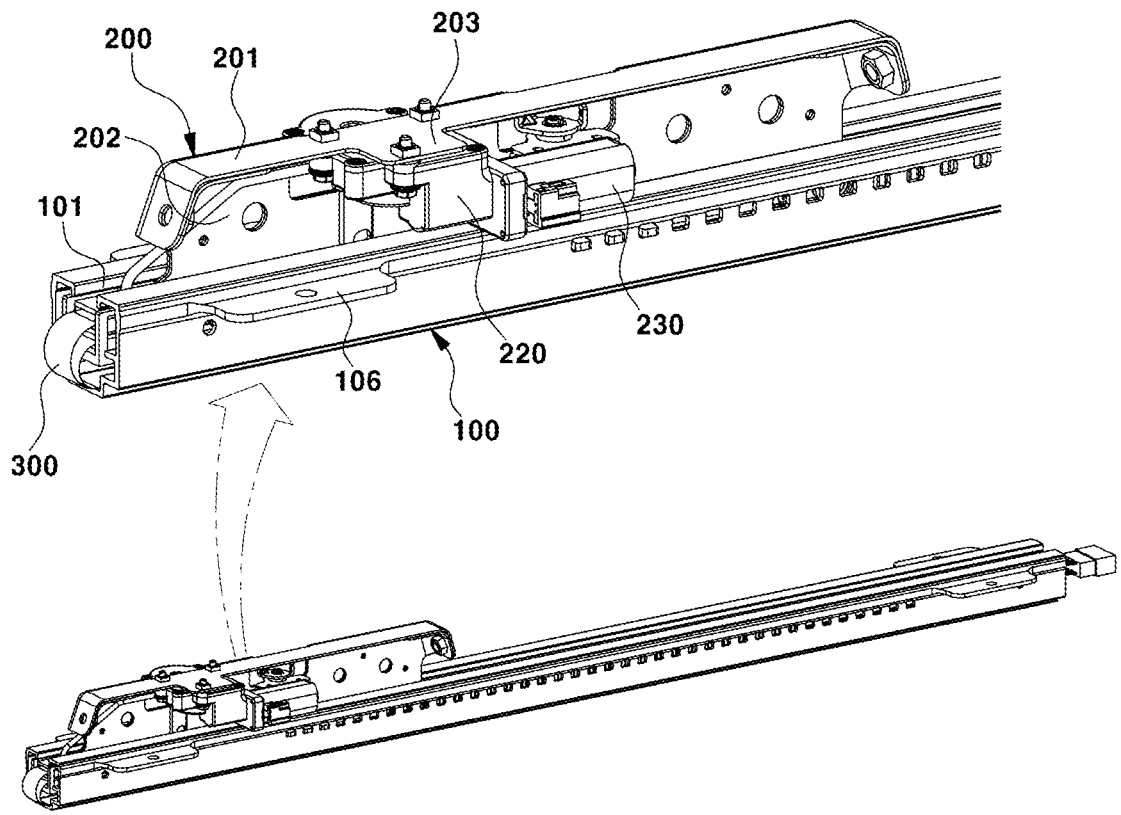
FIG. 2 is an assembled perspective view of the powered rail apparatus for a vehicular seat according to the present invention.
Figure 3:
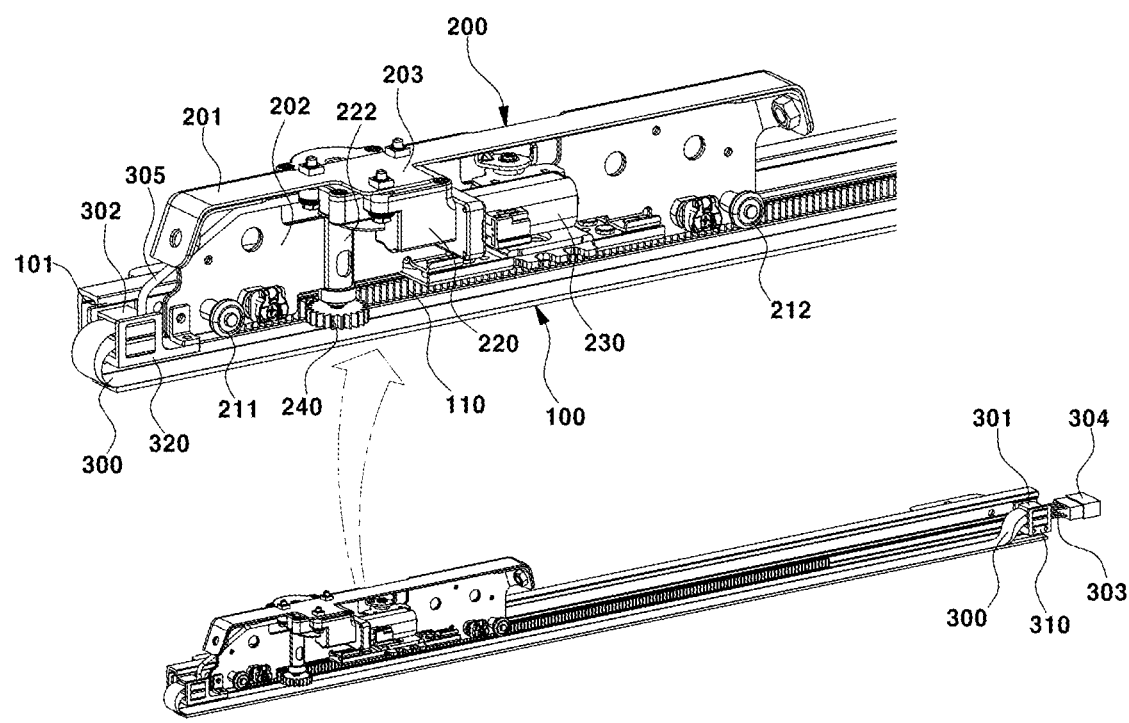
FIG. 3 is an assembled perspective view of the powered rail apparatus for a vehicular seat according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, the reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it is to be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims.

Hereinafter, a preferred embodiment of the present invention will be described in detail with reference to the accompanying drawings.

Among the accompanying drawings, FIGS. 1 to 4 are perspective views illustrating a powered rail apparatus for a vehicular seat according to the present invention, wherein reference numeral "100" denotes a stationary rail.

The stationary rail 100 is also referred to as a lower rail, and is mounted on the lower portion of a floor panel in the state of being hidden thereby for planarization of the upper surface of the floor panel.

To this end, the stationary rail 100 has an open path 101, which is formed in the upper portion thereof so as to extend longitudinally for forward and backward movement of a movable rail 200. Furthermore, the stationary rail 100 is provided therein with a main transfer path 102 for forward and backward movement of the movable rail 200, a roller transfer path 103, and a rack-mounting space 104 in a predetermined arrangement.

Specifically, the main transfer path 102, in which a rail support plate 202 of the movable rail 200 and a power cable 300 are disposed so as to be moved anteroposteriorly, is formed in the stationary rail 100 immediately under the open path 101, and the roller transfer path 103 and the rack-mounting space 104 are respectively formed as independent spaces at upper and lower sides of two lateral sides of the main transfer path 102, with a partition wall 105 interposed therebetween.

Figure 5:
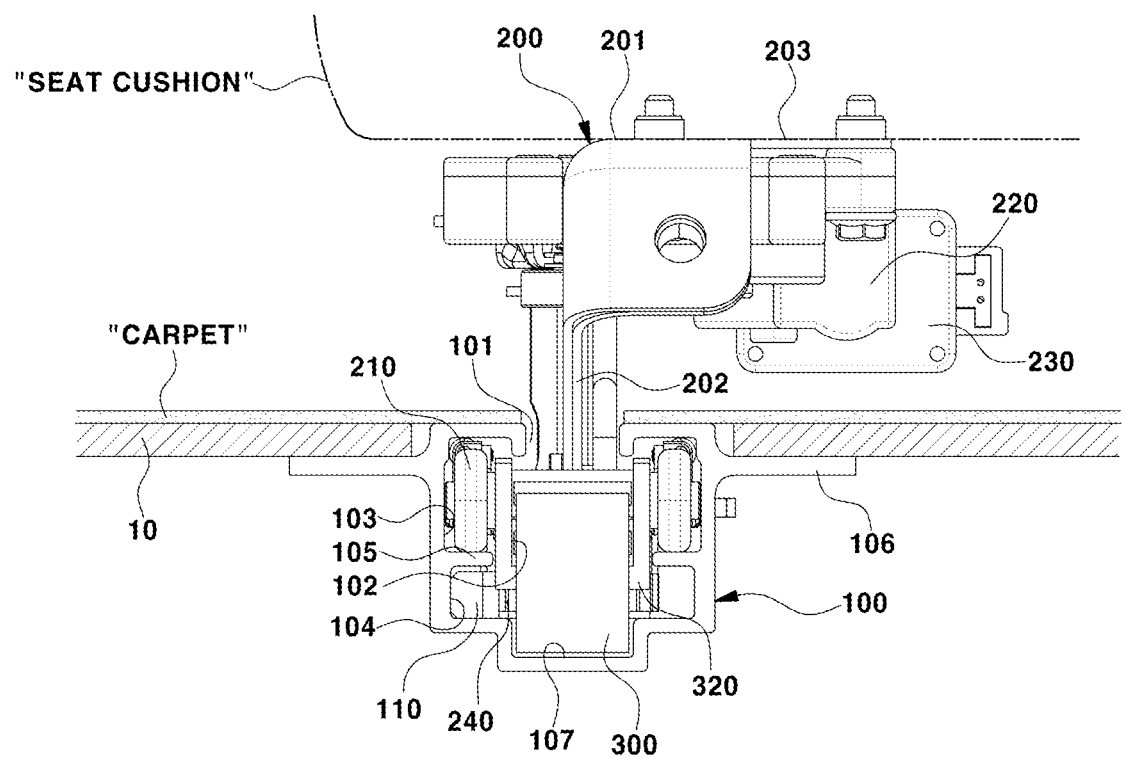

The stationary rail 100 is provided at upper positions of the outer lateral side surfaces thereof with panel-mounting ends 106 projecting therefrom for assembly with a floor panel 10. Because the panel-mounting ends 106 are fixed to the lower surface of the floor panel 10 in the state of being in close contact therewith through bolting, welding or the like, the stationary rail 100 is disposed in the state of being embedded in the lower portion of the floor panel 10, and the upper plate of the stationary rail 100 and the upper surface of the floor panel 10 are flush with each other, thereby realizing planarization of the floor panel 10, as illustrated in FIG. 5.

The stationary rail 100 has a seating groove 107, which is formed longitudinally in the bottom surface thereof. The seating groove 107 is provided therein with the power cable 300, constituted by a flexible flat cable, which has a thin flat structure and is made of a flexible material capable of being bent.

A rack 110 is mounted in the rack-mounting space 104 in the stationary rail 100 such that the teeth of the rack 110 face the main transfer path 102.

The movable rail 200 is also referred to as an upper rail, and is composed of a seat-mounting plate 201, which is disposed above the stationary rail 100, and a rail-supporting plate 202, which is integrally formed with the seat-mounting plate 201 and is disposed in the main transfer path 102 in the stationary rail 100 so as to be movable anteroposteriorly.

Consequently, by moving the rail-supporting plate 202 forwards or backwards along the main transfer path 102 in the stationary rail 100 in the state in which a seat cushion of a seat is assembled with the seat-mounting plate 201 of the movable rail 200, the position of the seat in an anteroposterior direction is controlled.

To this end, rollers 210 are rotatably mounted on the two lateral sides of the rail-supporting plate 202 of the movable rail 200 so as to be rolled in the roller transfer path 103 in the stationary rail 100.

Preferably, for stable anteroposterior movement of the movable rail 200, the rollers 210 include a first roll 211 and a second roller 212, which are respectively mounted on front and rear portions of the rail-supporting plate 202 so as to roll in the roller transfer path 103 in the stationary rail 100.

The movable rail 200 is moved anteroposteriorly along the stationary rail 100 using electric power. For electric driving of the movable rail 200, a gearbox 220 is mounted at a predetermined position on the movable rail 200, and a motor 230 is connected to the input shaft of the gearbox 220. Furthermore, a pinion 240, which is engaged with the rack 110, is mounted on a rotating shaft 222, which extends toward the inside of the stationary rail 200 from the output shaft of the gearbox 220.

Preferably, a gearbox-mounting plate 203 for mounting the gearbox 220 is integrally formed with the seat-mounting plate 201 of the movable rail 200 so as to be flush with the seat-mounting plate 201, and the gearbox 220 and the motor 230 are mounted on the lower surface of the gearbox-mounting plate 203.

Consequently, since the upper surface of the seat-mounting plate 201 of the movable rail 200 is formed as a flat seating surface for assembly with a seat cushion, it is possible to easily perform assembly with a seat cushion frame in the state of being close contact therewith.

The power cable 300, configured to supply electric power to the motor 230, is also disposed in the stationary rail 100 so as to be movable together with the movable rail 200.

In other words, the power cable 300 is connected to the rail-supporting plate 202 of the movable rail 200, is disposed in the stationary rail 100 so as to be movable along the main transfer path 102, and is connected to the motor 230 for power supply to the motor 230.

To this end, the power cable 300, which is made of a flexible flat cable, is seated in the seating groove 107 formed in the bottom surface of the stationary rail 100, and a first cable connector 301 and a second cable connector 302 are respectively and conductively connected to the two ends of the power cable 300.

More specifically, the first cable connector 301 is mounted to a first bracket 310, which is mounted to the rear end of the stationary rail 100, and the second cable connector 302 is mounted to a second bracket 320, which is mounted to the front end of the rail-supporting plate 202 of the movable rail 200. One end and the other end of the power cable 300 are respectively and conductively connected to the first cable connector 301 and the second cable connector 302.

The other end of the power cable 300 is curved upwards from the seating groove 107, and is conductively connected to the second cable connector 302.

A power supply connector 304 is connected to the first cable connector 301 via a first wire 303 disposed on the bottom surface of the floor panel.

In addition, a second wire 305 configured to supply power to the motor is further connected both to the second cable connector 302 and to the motor 230. The second wire 305 extends from the second cable connector 302, and is connected to the motor 230 through the open path 101 in the stationary rail 100.

Accordingly, when current from a power source of a battery is applied to the power supply connector 304, the current is supplied to the motor 230 sequentially via the first wire 303, the first cable connector 301, the power cable 300, the second cable connector 302 and the second wire 305, thereby activating the motor 230.

Figure 4:
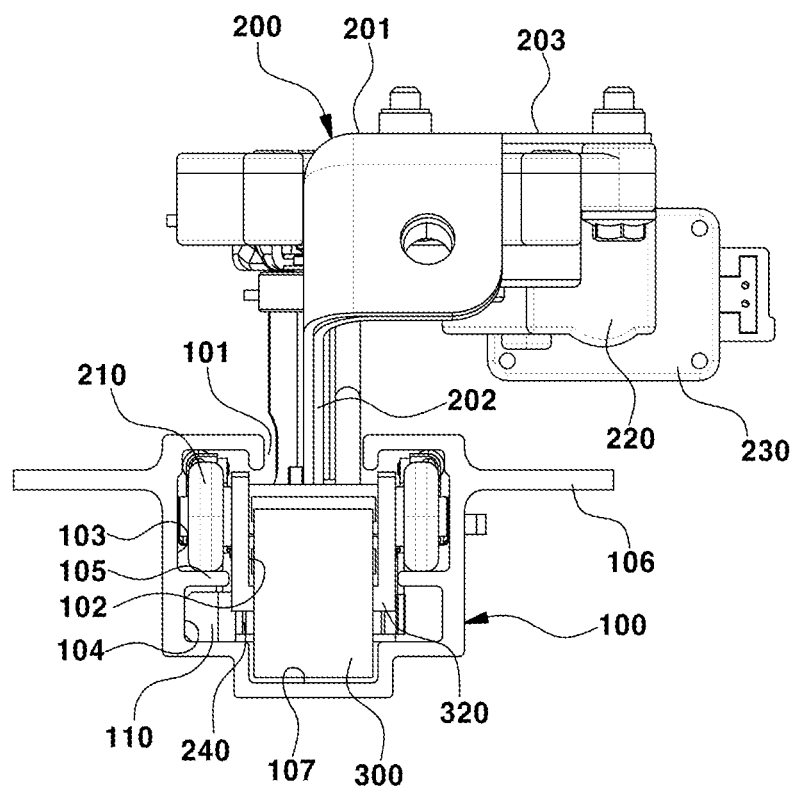
FIGS. 4 and 5 are cross-sectional views illustrating the powered rail apparatus for a vehicular seat according to the present invention.

When the powered rail apparatus according to the present invention is completely assembled, since the stationary rail 100 is mounted on the bottom surface of the floor panel 10 in the state of being hidden thereby, and the rollers 210, the rack 110, the pinion 240 and the like, which are for anteroposterior movement of the movable rail 200, are disposed in the stationary rail 200, planarization of the floor panel 10 is realized, as illustrated in FIGS. 4 and 5. Particularly, since the power cable 300 is disposed in the stationary rail 100 so as to be movable together with the movable rail 200, the power cable 300 is hidden, thereby completely eliminating factors inhibiting the planarization of the floor panel 10.

The operation of the powered rail apparatus according to the present invention, which is constructed as described above, will be described.

Figure 6:
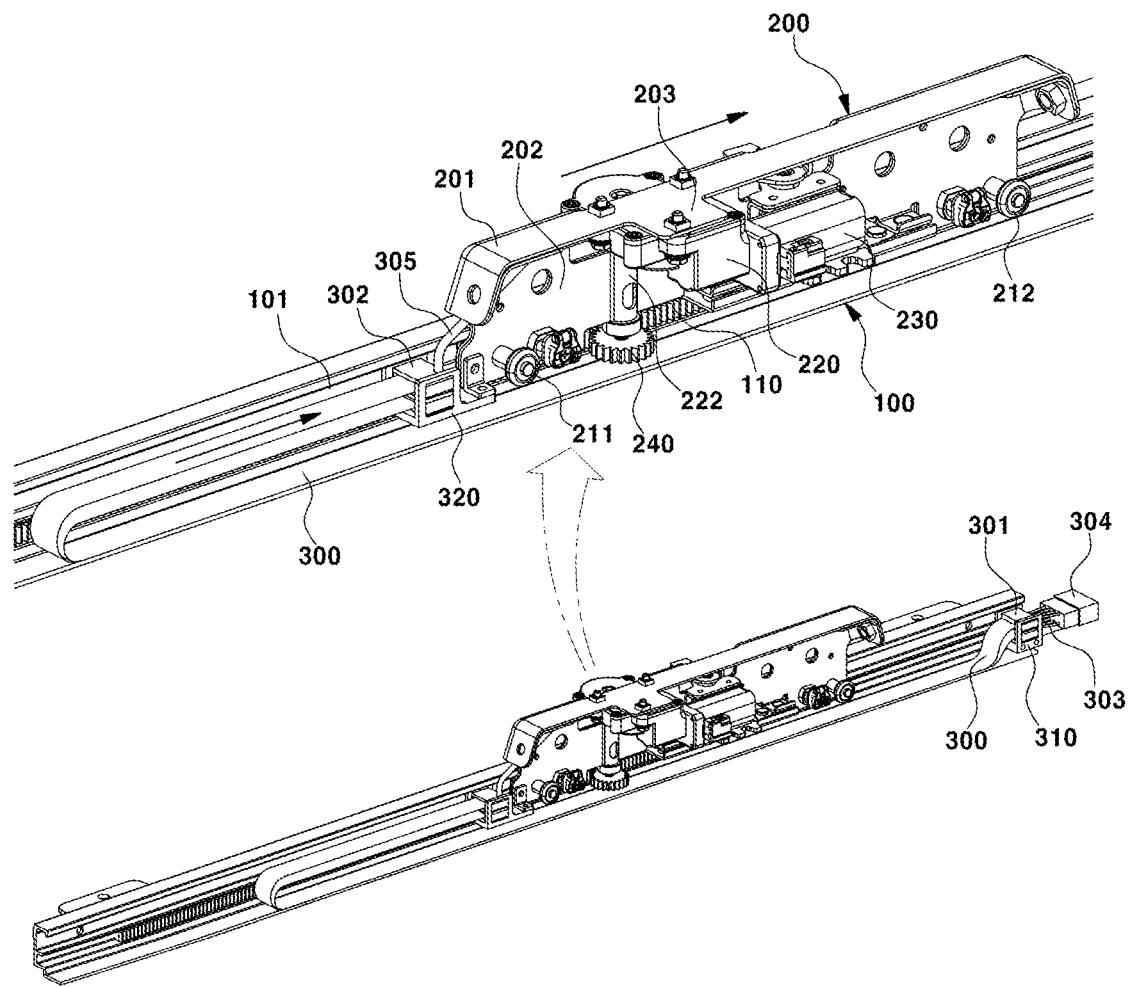
FIG. 6 is an assembled perspective view illustrating the state in which a movable rail and a power cable among the components of the powered rail apparatus for a vehicular seat according to the present invention are moved.

FIG. 6 illustrates the state in which the movable rail and the power cable among the components of the powered rail apparatus for a vehicular seat according to the present invention are moved.

First, when the motor 230 is activated by application of current to the motor 230, the rotative force of the motor 230 is subjected to speed reduction and is transmitted to the rotating shaft 222, thereby rotating the pinion 240 connected to the rotating shaft 222.

Subsequently, the rotating pinion 240 is moved along the rack 110, and the rollers 210 composed of the first roller 211 and the second roller 212 are rolled along the roller transfer path 103 in the stationary rail 100.

Here, since the rollers 210 are mounted to the rail-supporting plate 202 of the movable rail 200, the movable rail 200, which includes the rail-supporting plate 202 and the seat-mounting plate 201, which are integrally formed with each other, is moved forwards or backwards along the stationary rail 100.

More specifically, the rail-supporting plate 202 of the movable rail 200 is moved forwards or backwards along the main transfer path 102 in the stationary rail 100, and the seat-mounting plate 201 is moved forwards or backwards above the stationary rail 100, with the result that the seat mounted on the seat-mounting plate 201 is moved forwards or backwards to a desired position.

Accordingly, it is possible to easily and automatically move the stationary rail 100, which is mounted to the floor panel 10 in the state of being hidden thereby, to a desired position using the motor and the rack-and-pinion assembly.

When the movable rail 200 is moved forwards or backwards along the stationary rail 100, because the other end of the power cable 300 is connected to the second cable connector 302, which is mounted to the rail-supporting plate 202 via the second bracket 320, the other end of the power cable 300 is pulled or pushed by the rail-supporting plate 202 of the movable rail 200 and is thus moved forwards or backwards along the main transfer path 102 in the stationary rail 100, as illustrated in FIG. 6.

As described above, since the power cable 300, configured to supply power required to move the movable rail 200 forwards and backwards, to the motor is moved together with the movable rail 200 in the state of being hidden by the stationary rail 100, the power cable 300 is hidden, with the result that it is possible to completely eliminate factors inhibiting planarization of the floor panel and thus it is possible to more easily realize the planarization of the floor panel.

By virtue of the above-described construction, the present invention offers the following effects.

First, by mounting the stationary rail to the floor panel such that the stationary rail is hidden by the floor panel, it is possible to realize planarization of the floor panel.

Second, by mounting the movable rail, which is to be assembled with a seat, to the stationary rail via a rack-and-pinion mechanism such that the movable rail is movable forwards and backwards and by applying the rotative force resulting from activation of the motor to the pinion, it is possible to move the movable rail forwards and backwards to a desired position.

Third, by disposing the power cable configured to supply the power required to move the movable rail forwards and backwards to the motor, in the stationary rail so as to be hidden and by enabling the power cable to be moved together with the movable rail, it is possible to hide the power cable and thus it is possible to completely eliminate factors inhibiting planarization of the floor panel.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A powered rail apparatus for a vehicular seat comprising:
    a stationary rail mounted to a floor panel in a state of being hidden thereby, the stationary rail having an open path for forward and backward movement of a movable rail and having therein a roller transfer path, a main transfer path and a rack-mounting space, which are disposed in a predetermined arrangement;
    a rack mounted in the rack-mounting space;
    the movable rail, including a seat-mounting plate, which is disposed above the stationary rail, and a rail-supporting plate, which is disposed in the main transfer path in the stationary rail so as to be movable forwards and backwards, the seat-mounting plate and the rail-supporting plate being integrally formed with each other;
    a roller, which is rotatably mounted to the rail-supporting plate of the movable rail and is disposed in the roller transfer path in the stationary rail so as to be rolled;
    a gearbox mounted at a predetermined position on the movable rail;
    a motor connected to an input shaft of the gearbox;
    a pinion, which is mounted to a rotating shaft extending toward an inside of the stationary rail from an output shaft of the gearbox and which is engaged with the rack; and
    a power cable, which is connected to the rail-supporting plate of the movable rail and is movably disposed in the main transfer path of the stationary rail so as to supply power to the motor.

2. The powered rail apparatus of claim 1, wherein the stationary rail is constructed such that the main transfer path is positioned under the open path in which the rail-supporting plate and the power cable are disposed so as to be moved forwards and backwards and such that the roller transfer path and the rack-mounting space are respectively and independently formed in upper and lower portions of two lateral sides of the main transfer path, with a partition wall interposed therebetween.

3. The powered rail apparatus of claim 1, wherein the stationary rail includes a panel-mounting end projecting from an upper portion of an outer surface thereof for assembly with the floor panel.

4. The powered rail apparatus of claim 1, wherein the stationary rail has a seating groove formed in a bottom surface thereof in which the power cable is seated.

5. The powered rail apparatus of claim 1, wherein the power cable is constituted as a flexible flat cable capable of being bent.

6. The powered rail apparatus of claim 1, wherein the seat-mounting plate of the transfer rail includes a gearbox-mounting plate which is configured to be flush with the seat-mounting plate, and a gearbox is mounted on a lower surface of the gearbox-mounting plate.

7. The powered rail apparatus of claim 1, wherein the roller includes a first roller and a second roller, which are respectively mounted to front and rear portions of the rail-supporting plate and are disposed in the roller transfer path so as to be rolled.

8. The powered rail apparatus of claim 1, further comprising:
    a first bracket securely mounted to a rear end of the stationary rail;
    a first cable connector, which is conductively connected to one end of the power cable and is mounted to the first bracket;
    a second bracket, which is mounted to a front end of the rail-supporting plate; and
    a second cable connector, which is conductively connected to a remaining end of the power cable and is mounted to the second bracket.

9. The powered rail apparatus of claim 8, wherein a second wire is disposed between the second cable connector and the motor and is connected thereto so as to supply power to the motor.

10. The powered rail apparatus of claim 8, wherein a power supply connector is connected to the first cable connector via a first wire disposed on a bottom surface of the floor panel.

* * * * *